US008708554B2

(12) United States Patent
Thompson et al.

(10) Patent No.: US 8,708,554 B2
(45) Date of Patent: Apr. 29, 2014

(54) LEAK DETECTION APPARATUS FOR AIRCRAFT BLEED AIR SYSTEMS

(75) Inventors: William W. Thompson, Laguna Niguel, CA (US); Allen W. Harwood, Fountain Valley, CA (US); Glenn Stark, Corona, CA (US)

(73) Assignee: Arrowhead Products Corporation, Los Alamitos, CA (US)

( * ) Notice: Subject to any disclaimer, the term of this patent is extended or adjusted under 35 U.S.C. 154(b) by 297 days.

(21) Appl. No.: 13/068,550

(22) Filed: May 12, 2011

(65) Prior Publication Data
US 2012/0287960 A1 Nov. 15, 2012

(51) Int. Cl.
*G01K 1/00* (2006.01)

(52) U.S. Cl.
USPC ............... 374/4; 374/45; 374/141; 374/208; 374/43; 701/36; 340/945

(58) Field of Classification Search
USPC ............. 374/100, 4, 5, 45, 57, 163, 185, 141, 374/183, 147, 29, 137, 110, 11, 1, 12, 114, 374/115, 166, 167, 109, 208, 49.5, 40.5 R, 374/43, 44; 701/3, 100, 29.2, 104, 36; 702/130; 73/49.1, 49.5, 40.5 R; 340/945
See application file for complete search history.

(56) References Cited

U.S. PATENT DOCUMENTS

| | | | |
|---|---|---|---|
| 3,996,789 A | 12/1976 | Wilson | |
| 4,282,743 A | 8/1981 | Pickett | |
| 4,295,669 A | 10/1981 | LaPrade et al. | |
| 4,302,033 A | 11/1981 | Evans et al. | |
| 4,458,521 A | 7/1984 | Pillette | |
| 4,466,273 A | 8/1984 | Piliette | |
| 4,507,954 A | 4/1985 | Boutwell | |
| 4,519,562 A * | 5/1985 | Willis | 244/207 |
| 4,534,662 A | 8/1985 | Barlian | |
| 4,557,139 A | 12/1985 | Cantwell et al. | |
| 4,576,038 A | 3/1986 | Dixon et al. | |
| 4,583,394 A | 4/1986 | Murakami et al. | |
| 4,601,194 A | 7/1986 | Miller et al. | |
| 4,655,607 A * | 4/1987 | Kern et al. | 374/4 |
| 4,723,441 A | 2/1988 | Sweeney | |
| 4,727,749 A | 3/1988 | Miller et al. | |
| 4,750,189 A * | 6/1988 | Lancaster et al. | 374/4 |
| 4,864,847 A | 9/1989 | Anderson et al. | |
| 4,879,896 A | 11/1989 | Miller et al. | |
| 5,067,094 A | 11/1991 | Hayes | |

(Continued)

FOREIGN PATENT DOCUMENTS

GB 2025536 A * 1/1980
WO WO85/02906 4/1985

*Primary Examiner* — Gail Verbitsky
(74) *Attorney, Agent, or Firm* — Roy A. Ekstrand

(57) ABSTRACT

A leak detection apparatus for aircraft bleed air systems includes a supporting spacer positioned within the shroud and supported upon the bleed air duct of the aircraft. A sleeve supported on the exterior of the shroud further supports a plenum having generally cylindrical sensor tubes through which sensor wire sets pass. A director positioned within the shroud above the bleed air duct is coupled to a generally cylindrical accumulator which in turn is in communication with the plenum. Appropriate apertures are provided to vent and direct bleed air from the shroud interior to the sensor wire sets and thereafter vent outwardly into cooler ambient air. The sensor wire sets respond to the temperature of the bleed air leakage to trigger alarm apparatus.

5 Claims, 2 Drawing Sheets

(56) References Cited

U.S. PATENT DOCUMENTS

| | | | |
|---|---|---|---|
| 5,170,659 A | 12/1992 | Kemp | |
| 5,294,909 A * | 3/1994 | Frazier | 338/26 |
| 5,330,720 A | 7/1994 | Sorbo et al. | |
| 5,461,904 A | 10/1995 | Baker | |
| 5,846,354 A * | 12/1998 | Winston et al. | 152/418 |
| 6,112,580 A | 9/2000 | Hesky | |
| 6,354,140 B1 | 3/2002 | Farkas et al. | |
| 6,592,126 B2 | 7/2003 | Davis | |
| 6,722,185 B2 | 4/2004 | Lawson et al. | |
| 6,796,324 B2 | 9/2004 | Dilger et al. | |
| 6,838,418 B2 * | 1/2005 | Allan et al. | 507/224 |
| 6,920,890 B2 * | 7/2005 | Sanders et al. | 137/12 |
| 7,056,013 B2 * | 6/2006 | Anderson et al. | 374/138 |
| 7,155,961 B2 * | 1/2007 | Fernandes et al. | 73/49.1 |
| 7,509,841 B2 | 3/2009 | Spaolonzi et al. | |
| 7,716,967 B2 | 5/2010 | Woods et al. | |
| 8,439,065 B2 * | 5/2013 | Dirkin et al. | 137/197 |
| 8,484,943 B2 * | 7/2013 | Cunha et al. | 60/226.1 |
| 2004/0154380 A1 | 8/2004 | Walker | |
| 2007/0220984 A1 * | 9/2007 | Slagle et al. | 73/708 |
| 2009/0223284 A1 | 9/2009 | Buhring | |
| 2010/0023201 A1 * | 1/2010 | Kinney et al. | 701/33 |
| 2010/0158068 A1 * | 6/2010 | Monteiro | 374/4 |
| 2012/0185116 A1 * | 7/2012 | DeFrancesco | 701/3 |
| 2013/0013222 A1 * | 1/2013 | Gu et al. | 702/33 |

* cited by examiner ced radial point. A suitable sensing device is located at the

LEAK DETECTION APPARATUS FOR AIRCRAFT BLEED AIR SYSTEMS

FIELD OF THE INVENTION

This invention relates generally to bleed air ducting systems of the type used in aircraft and relates particularly to leak detection apparatus used therein.

BACKGROUND OF THE INVENTION

Modern aircraft utilize fluid transport ducting systems to circulate high-pressure, high-temperature air ported from one of the aircraft turbine engine compressor stages. Because this high-pressure, high-temperature air is diverted or "bled" from a turbine compressor stage, such circulation systems are generally referred to in the art as "bleed air" systems.

For the most part, this high-pressure, high-temperature bleed air is used within the aircraft for deicing the leading edges of wings and stabilizers as well as engine inlets. Bleed air is also used for cabin pressurization and cabin heating.

Because bleed air may exceed temperatures of 1,350 degrees Fahrenheit it is an excellent high-volume, high-capacity heat source which readily meets the above-mentioned aircraft needs. Unfortunately, such elevated temperatures are well above the safe operating limits of the materials typically used in aircraft construction. For example, the structural properties of aluminum alloys used in aircraft structures are degraded above 350 degrees Fahrenheit. Similarly, most modern aircraft type composite materials cannot be safely used in environments above 250 degrees Fahrenheit. Thus, aircraft bleed air systems must be fabricated to avoid any risk of high pressure, high temperature bleed air leakage.

Aircraft bleed air duct systems utilize a network of sealed ducts structured to withstand system pressures and temperatures. For increased safety and reliably, the ducts are further surrounded by refractory insulation which in turn is surrounded by a metallic or composite material gas impervious shroud. This surrounding shroud serves to provide a redundant seal for the bleed air ducts thereby increasing safety and reliability. In addition, the outer shroud tends to confine and collect bleed air leaking from the interior duct. Taking advantage of this behavior, practitioners in the art have devised various bleed air leak detection systems which are designed to port bleed air leaking into the space between the shroud and the duct and to direct it toward temperature sensors. The sensors, in turn, respond and trigger appropriate alarms to alert the aircraft crew.

It will be understood that the primary design consideration exercised in fabricating bleed air leak detection systems is the effective sensing of any leakage within the bleed air system. Notwithstanding this primary consideration, a secondary consideration arises which is also important. This consideration concerns the avoidance of false triggering of bleed air leakage alarms. Unplanned landings, aborts and schedule delays caused by false alarms within the bleed air leak detection system negatively impacts airline efficiency of operation and passenger inconvenience.

Faced with the need to provide reliable, safe and effective bleed air leak detection systems, practitioners in the art have provided a variety of leak detection and monitoring apparatus. For example, in what is perhaps the most traditional bleed air leak detection system, a pair of temperature sensitive wires are supported along the outer shroud of the duct system. Each wire includes a coaxial inner and outer conductor set separated by a eutectic salt which is nonconductive as normal temperature but which becomes conductive when melted. One or more apertures are formed in the shroud near the temperature sensitive wires. The object is to direct leaking high temperature bleed air which accumulates within the shroud toward the temperature sensitive wires. In response to a flow of high temperature leaking bleed air, the eutectic salt melts becoming conductive and forming a short circuit between the inner and outer coaxial conductors. The resulting short circuit triggers a cockpit alarm.

U.S. Pat. No. 7,155,961 issued to Fernandes et al sets forth a BLEED LEAK DETECTION SYSTEM having a cuff secured over a circumferential cut in the duct shroud and underlying insulation. The cuff further supports a manifold in communication with the cuff to define a conduit which collects hot air from a bleed air system leak. A pair of heat sensitive wires are coupled to the manifold and are thus subjected to high temperature bleed air leaking from the interior duct.

U.S. Pat. No. 4,750,189 issued to Lacaster et al sets forth a DUCTED FLOW LEAK DETECTION arrangement for detecting and isolating leaks in a high temperature ducted flow system such as an aircraft bleed air apparatus. The arrangement is configured such that leaking bleed air is contained within the insolating air space of the duct system and constrained to flow to one predetermined end of the duct system. The leaking bleed air is ejected through a fluid outlet opening positioned in close proximity to leak sensing means.

U.S. Pat. No. 7,716,967 issued to Woods et al sets forth a LEAK DETECTOR SLEEVE formed of elastomeric material which is placed upon and encircled a flanged joint forming a gas tight seal thereon. The sleeve includes a hole that communicates with a gap in the flange joint thereby allowing the tip of a sniffer probe to be placed in or near the hole for detection of leakage.

U.S. Pat. No. 5,461,904 issued to Baker sets forth LEAK DETECTION MEANS AND METHOD that directs any leaked fluid from a fluid system joint to a single preselected radial point thereon. A suitable sensing device is located at the preselected radial point.

U.S. Pat. No. 4,655,607 issued to Kern et al sets forth a HIGH SPEED HOT AIR LEAK SENSOR for sensing jet engine bleed air leaks in an aircraft. Infrared detectors are combined with thermal re-radiating elements which are installed in air passages adjacent to the bleed air ducts and downstream of the region where the air bleed leak may occur.

U.S. Pat. No. 7,509,841 issued to Spaolonzi et al sets forth a FLEXIBLE LEAK DETECTION SYSTEM AND METHOD FOR DOUBLE CARCASS HOSE which is supported upon a hole line segment. The leak detection system is supported upon the outer containment carcass of the inner carcass and includes an internal housing chamber in fluid communication with the collection space between the inner and outer carcass. A system sensor is supported upon the housing and is in communication with the collected fluid.

Published patent application US2010/0158068 filed on behalf of Montero sets forth a BLEED LEAKAGE DETECTION SYSTEM AND METHOD having an arrangement of thermostats that are capable of detecting the location where bleed air leakage is occurring. The system provides continuous monitoring of thermostat sensor wiring during flight and thermostat self test function prior to flight.

While the foregoing described prior art devices have to some extent improved the art and have in some instances enjoyed commercial success, there remains nonetheless a continuing need in the art for ever more improved, safe, effective and reliable bleed air leak detection systems for operation within aircraft, spacecraft and the like.

SUMMARY OF THE INVENTION

Accordingly, it is a general object of the present invention to provide an improved leak detection apparatus for aircraft bleed air systems. It is a more particular object of the present invention to provide an improved leak detection apparatus for aircraft bleed air systems which utilizes an effective and reliable structure for collecting leaking bleed air between the system duct and shroud and for directing the leaking bleed air toward temperature sensing wires supported by the leak detection apparatus. It is a further object of the present invention to provide an improved leak detection apparatus for aircraft bleed systems which further vents collected bleed air leakage outwardly for combination with cooler ambient air and avoidance of aircraft structural elements.

In accordance with the present invention, there is provided for use in an aircraft bleed air system having an inner bleed air duct surrounded by a gas impervious shroud defining a space therebetween, a bleed air leak detection system comprising: a space supported upon a bleed air duct and having an outer support surface within a shroud; a sleeve received upon a shroud overlying the outer support surface and captivating a portion of a shroud between the sleeve and the outer surface; a plenum having a plenum space therein and a pair of elongated hollow sensor tubes each in communication with the plenum space; a pair of sensor wire sets passing through the sensor tubes; and a bleed air leakage director and accumulation coupled to the plenum space and a shroud space having means for directing bleed air leakage into the plenum space and the sensor tubes unto the sensor wire sets.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT OF THE INVENTION

Figure 1:
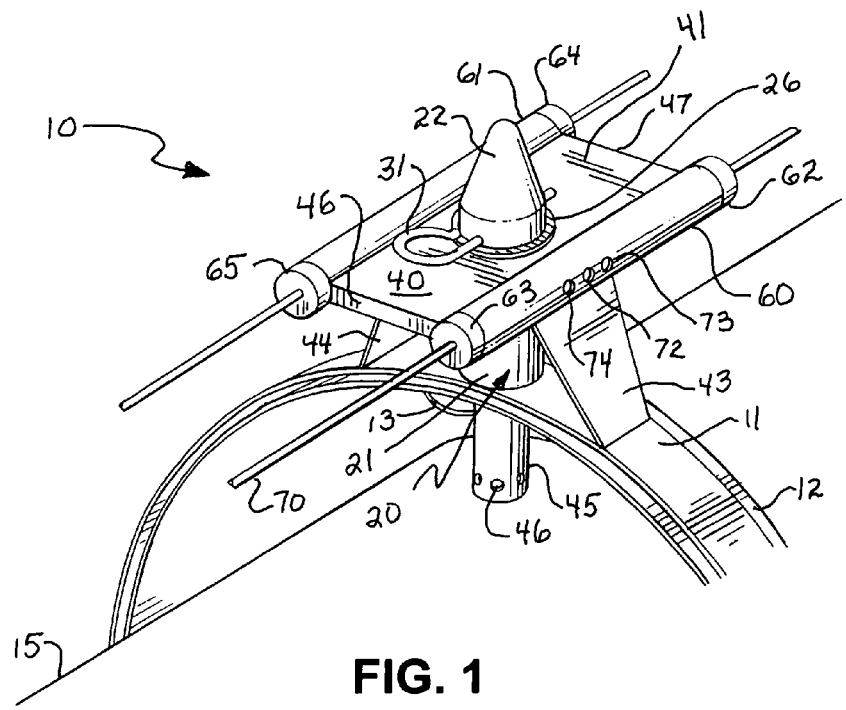
FIG. 1 sets forth a perspective view of a leak detection apparatus for aircraft bleed air systems constructed in accordance with the present invention and supported upon a typical host bleed air duct.

FIG. 1 sets forth a perspective view of a bleed air leak detector constructed in accordance with the present invention and generally referenced by numeral 10. Bleed air leak detector 10 is supported by a spacer 12 and a sleeve 11. With temporary reference to FIG. 3, it will be noted that sleeve 11 is supported on the exterior surface of a shroud 14 while spacer 12 is positioned upon bleed air duct 15 underlying the interior surface of shroud 14. Accordingly and as is also better seen in FIG. 3, sleeve 11 and spacer 12 captivate shroud 14.

Returning to FIG. 1 for purposes of illustration, shroud 14 is omitted from the figure and thus bleed air duct 15 is shown having sleeve 11 and spacer 12 supported spaced from and encircling bleed air duct 15. Bleed air duct 15 and shroud 14 (seen in FIG. 3) will be understood to be fabricated in general accordance with conventional fabrication. Sleeve 11 is preferably fabricated of a suitable strong material such as metal or composite material and further supports a pair of upwardly extending angled supports 43 and 44. Supports 43 and 44 in turn support a plenum 40 formed by an upper plate 41 and a lower plate 42 in a spaced relationship. Plenum 40 is completed by a pair of closed ends 46 and 47. Plenum 40 further includes a pair of elongated generally cylindrical sensor tubes 60 and 61 each in communication with plenum 40. Sensor tube 60 forms a sensor tube plenum in communication with plenum 40 and supports a pair of grommets 62 and 63 which in turn support a coaxial sensor wire set 70. Similarly, sensor tube 61 is generally cylindrical and forms a sensor tube plenum in communication with plenum 40. Sensor tube 61 further supports a pair of grommets 64 and 65 through which a coaxial sensor wire set 71 passes. Sensor tube 60 further defines a plurality of vent apertures 72, 73 and 74 formed on sensor tube 60 and a further plurality of apertures 75, 76 and 77 (seen in FIG. 2) formed on sensor tube 61.

Leak detector 10 further includes a generally cylindrical bleed air director 45 comprising a hollow cylindrical element defining a plurality of apertures 46 on the lower end thereof. As is better seen in FIG. 3, the lower end of director 45 is preferably positioned above and slightly spaced from the outer surface of duct 15. Leak detector 10 further includes a generally cylindrical body 21 supported upon sleeve 11 in communication with director 45. The upper end of cylindrical body 21 passes upwardly through apertures formed in plenum 40 (seen in FIG. 3) and terminates in a conical bullet cap 22. Cap 22 defines a pair of opposed apertures therein which receive a retaining clip 31. A washer 26 is captivated between clip 31 and upper plate 41 of plenum 40.

In operation, coaxial sensor wire sets 70 and 71 are fabricated in accordance with the above-described conventional fabrication and thus each includes a surrounding conductor within which a centered interior conductor is supported by the above-mentioned eutectic salt insulator. As mentioned above, the eutectic salt insulator within sensor wire sets 70 and 71 is nonconductive unless melted at which point it become conductive and creates a localized short circuit within the coaxial sensor wire set. Thus, in the absence of a bleed air leak, the interior conductors of each of sensor wire sets 70 and 71 remain electrically isolated from their respective external surrounding conductors and no bleed air alarm is triggered.

In the event of bleed air leakage within bleed air duct 15, high temperature bleed air begins to fill the space between shroud 14 (seen in FIG. 3) and the exterior surface of bleed air duct 15. This high temperature bleed air leakage is sufficiently pressurized to produce bleed air flow into the interior of director 45. As is better seen in FIG. 3, this bleed air flow is able to enter director 45 through apertures 46 as well as flowing upwardly through the open bottom end of director 45. The escaping bleed air leakage flows upwardly through director 45 and into cylindrical body 21. The bleed air then flows further to plenum 40 in the manner set forth below in FIG. 2 and thereafter exits plenum 40 through apertures 72 through 74 formed in sensor tube 60 and apertures 75 through 77 formed in sensor tube 61. As the high temperature bleed air leakage flows outwardly through apertures 72 through 74 in sensor tube 60, it imparts heat to the portion of sensor wire set 70 passing through sensor tube 60. The high temperature bleed air leakage heats sensor wire set 70 melting the eutectic salt therein and producing the above-mentioned electrical conduction between the outer conductor and interior conductor thereby triggering a bleed air leak detection. Similarly, the portion of bleed air leakage passing outwardly through apertures 75 through 77 (seen in FIG. 2) of sensor tube 61 produces a similar heating of the portion of sensor wire set 71 within sensor tube 61. Once again, the bleed air leakage heats the eutectic salt within sensor wire 71 causing electrical conduction and a leak detection signal event. In accordance with the preferred fabrication of the present invention, bleed air leak detector 10 is positioned with respect to surrounding aircraft structure (not shown) such that the high temperature bleed air leak is directed away from surrounding aircraft structural elements and harmlessly mixes with cooler ambient air.

Figure 2:
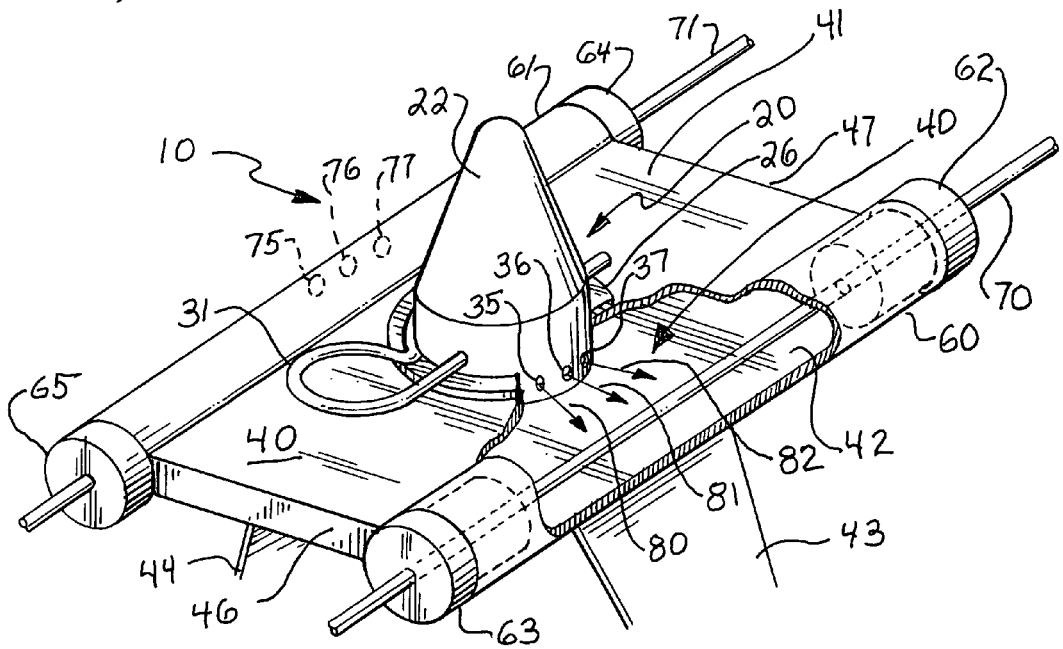
FIG. 2 sets forth a partially sectioned perspective view of the upper portion of the leak detection apparatus for aircraft bleed air systems shown in FIG. 1.

FIG. 2 sets forth an enlarged partially sectioned view of the upper portion of bleed air leak detector 10. As described above, bleed air leak detector 10 is supported by a pair of angled supports 43 and 44. As is also described above, bleed air leak detector 10 includes a plenum 40 formed of an upper plate 41 and a lower plate 42 in a spaced relationship. Plenum 40 is completed by a pair of closed ends 46 and 47. A generally cylindrical sensor tube 60 is formed in communication with plenum 40 and further supports a pair of grommets 62 and 63 on opposed ends thereof. Bleed air leak detector 10 further includes a generally cylindrical sensor tube 61 oppositely positioned from sensor tube 60 and in communication with plenum 40. Sensor tube 61 supports a pair of grommets 64 and 65. A plurality of vent apertures 75, 76 and 77 are formed in the outer wall of sensor tube 61.

Coaxial sensor wire sets 70 and 71 pass through sensor tubes 60 and 61 respectively. Wire sets 70 and 71 are insulated from sensor tubes 60 and 61 by grommets 62 through 65. As is better seen in FIG. 3, upper plate 41 and lower plate 42 of plenum 40 define respective apertures 48 and 49 through which cylindrical body 21 of accumulator 20 pass. A washer 26 is received upon upper plate 41 and is captivated against upper plate 41 by a snap clip 31. Cap 22 of accumulator 20 provides a closed end for cylindrical body 21. Cylindrical body 21 defines a plurality of apertures 35, 36 and 37 on one side thereof and a corresponding plurality of apertures 27, 28, 29 and 30 (seen in FIG. 3) on the opposed side thereof.

Figure 3:
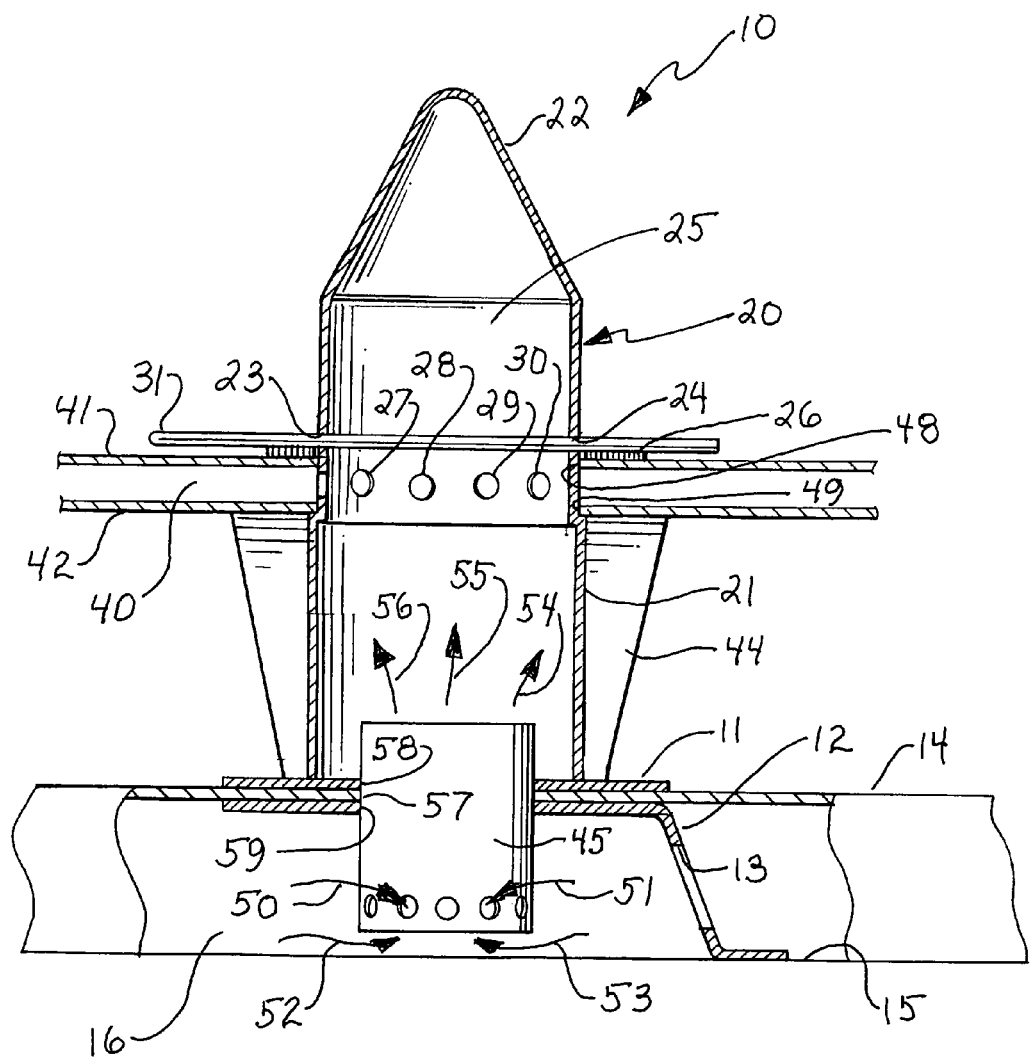
FIG. 3 sets forth a section view of the present invention leak detection apparatus for aircraft bleed air systems supported upon a typical bleed air system duct.

In operation as bleed air leakage flows upwardly through cylindrical body 21 in the manner set forth and described in FIG. 3 in greater detail, suffice it to note here that high temperature bleed air flows outwardly through apertures 35 through 37 on one side of cylindrical body 21 and outwardly through apertures 27 through 30 (seen in FIG. 3) on the opposite side of cylindrical body 21. This outward flow of high temperature bleed air is shown indicated in FIG. 2 by arrows 80, 81 and 82. It will be understood that a corresponding air flow of high temperature bleed air is taking place on the opposite side of cylindrical body 21. As high temperature bleed air flows outwardly in the directions indicated by arrows 80 through 82, it moves across the exposed portion of sensor wire set 70 causing the above-described melting of eutectic salt therein. The flow of high temperature bleed air continues outwardly from sensor tube 60 and is vented to the ambient space through apertures 70 through 74 (seen in FIG. 1). Correspondingly, bleed air passes outwardly through plenum 40 from the opposite side of cylindrical body 21 and passes through sensor tube 61 to vent through apertures 75 through 77. The outward flow of high temperature bleed air passing through sensor tube 61 produces localized heating of sensor wire set 71 melting the eutectic salt therein and producing a second alarm signal condition.

In accordance with an important advantage of the present invention, it will be appreciated that sensor tubes 60 and 61 together with grommets 62 through 65 cooperate to securely hold sensor wire sets 70 and 71 at spaced apart points. This serves to avoid imposing localized stress on the sensor wire sets.

FIG. 3 sets forth a section view of bleed air leak detector 10. Leak detector 10 is shown secured to a shroud 14 which in turn encloses a duct 15 both fabricated in accordance with conventional fabrication techniques. A generally cylindrical spacer 12 is positioned upon the outer surface of duct 15 and includes a raised portion having a plurality of apertures such as aperture 13 formed therein. The upper portion of spacer 12 provides a support surface for leak detector 10. Spacer 12 is positioned beneath the undersurface of shroud 14. A generally cylindrical sleeve 11 encircles shroud 14 overlying the upper portion of spacer 12 and captivating the intervening portion of shroud 14. Sleeve 11 and the upper portion of spacer 12 define apertures 58 and 59 which are positioned in alignment with each other. Correspondingly, an aperture 58 is formed in shroud 14 between apertures 58 and 59. Correspondingly, leak detector 10 includes a generally cylindrical director 45 which passes through apertures 57, 58 and 59. In the preferred fabrication of leak detector 10, director 45 is joined to sleeve 11 utilizing a weld joint or other suitable attachment. Director 45 is spaced from the outer surface of duct 15 to facilitate bleed air flow into the lower end of director 45 as indicated by arrows 52 and 53. Further, a plurality of apertures such as apertures 46 are formed in the lower end of director 45 through which further bleed air leakage flow enters director 45 as indicated by arrows 50 and 51.

Bleed air leak detector further includes a cylindrical body 21 supported upon sleeve 11 and secured thereto by conventional welded attachment or the like. Cylindrical body 21 extends upwardly defining an interior cavity 25 therein. The upper end of cylindrical body 21 terminates in a closed generally conical cap 22. Cylindrical body 21 and cap 22 combine to form a bleed air leak accumulator 20. A plurality of apertures 27, 28, 29 and 30 are formed in cylindrical body 21. Leak detector 10 further includes a plenum 40 comprised of spaced apart upper plate 41 and lower plate 42. Upper plate 41 defines an aperture 48 while lower plate 42 defines an aperture 49. Cylindrical body 21 of accumulator 20 extends upwardly through apertures 48 and 49 of plates 41 and 42. Plenum 40 is positioned upon cylindrical body 21 such that apertures 27, 28, 29 and 30 are in communication with the interior space of plenum 40. A washer 26 is received upon upper plate 41 and is captivated by a clip 31. Clip 31 is fabricated in accordance with conventional fabrication techniques and passes through opposed apertures 23 and 24 formed within cylindrical body 21. Clip 31 and washer 26 cooperate to secure plenum 40 upon cylindrical body 21. Plenum 40 is further supported by upwardly angled supports 43 and 44 (support 43 seen in FIG. 1). In accordance with conventional fabrication techniques, insulated space 16 formed between the outer surface of duct 15 and the interior surface of shroud 14 may be filled with a suitable refractory or insulation material. Such material is not shown in FIG. 3 to avoid unduly cluttering the drawing figure.

In operation as bleed air leakage accumulating within insulated space 16 enters director 45 in the manner indicated by arrows 50 through 53, it passes upwardly through the interior of director 45 and into interior cavity 25 in the manner shown by arrows 54, 55 and 56. The bleed air leakage filling interior cavity 25 of accumulator 20 ultimately flows outwardly through vent apertures 27 through 30 and vent apertures 35 through 37 (seen in FIG. 2) into the interior space of plenum 40. The high temperature bleed air leakage flowing into plenum 40 is directed toward sensor wire sets 70 and 71 in the manner shown and described above in FIG. 2.

What has been shown is a highly effective, robust and reliable leak detection apparatus for bleed air systems which carries all bleed air leakage flows to leak detector wires mounted on or near bleed air ducts for the purpose of detecting hazardous leakage which might otherwise prove potentially damaging for aircraft structures or systems. The present invention structure ensures that leakage of heated pressurized bleed air is directed initially to the detector wire sets and thereafter vented to the cooler ambient in a safe manner avoiding aircraft surrounding structures. The present invention system extracts leakages within the interior of the duct system shroud and delivers them through a rigid metallic manifold directly onto the detection wire set. The present invention leak detection apparatus functions to robustly support and accurately locate the detection wires at well-defined locations and orientations upon the duct system.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in an aircraft bleed air system having an inner bleed air duct surrounded by a gas impervious shroud defining a space therebetween, a bleed air leak detection system comprising:

a space supported upon a bleed air duct and having an outer support surface within the shroud;

a sleeve received upon a shroud overlying said outer support surface and captivating a portion of the shroud between said sleeve and said outer surface;

a plenum having a plenum space therein and a pair of elongated hollow sensor tubes each defining a sensor tube plenum in communication with said plenum space;

a pair of sensor wire sets passing through said sensor tube plenums; and a bleed air leakage director and accumulation coupled to said plenum space and the shroud space having means for directing bleed air leakage into said plenum space and said sensor tubes unto said sensor wire sets.

2. The bleed air leak detection system set forth in claim 1 wherein said sensor tubes each define at least one vent aperture.

3. The bleed air leak detection system set forth in claim 2 wherein said hollow sensor tubes each define opposed ends and wherein said sensor tubes each include insulative grommets coupled to said opposed ends for supporting said sensor wire sets passing through said sensor tubes.

4. The bleed air leak detection system set forth in claim 3 wherein said bleed air leakage director and accumulator includes a generally cylindrical director extending into the space between the shroud and the duct having a plurality of apertures formed therein and a generally cylindrical body communicating bleed air leakage from said director to said plenum space.

5. The bleed air leak detection system set forth in claim 4 wherein said generally cylindrical body defines a plurality of apertures aligned with said plenum space.

* * * * *